United States Patent [19]
Nelson

[11] 4,022,922
[45] May 10, 1977

[54] METHOD AND APPARATUS FOR ASEPTIC BULK STORAGE OF APPLE SAUCE

[75] Inventor: Philip E. Nelson, West Lafayette, Ind.

[73] Assignee: Purdue Research Foundation, West Lafayette, Ind.

[22] Filed: Sept. 22, 1975

[21] Appl. No.: 615,227

[52] U.S. Cl. .............................. 426/638; 426/418; 426/481; 426/521
[51] Int. Cl.² ..................... A23L 1/212; A23L 3/22
[58] Field of Search .......... 426/589, 481, 486, 521, 426/418, 399, 638; 99/483, 485, 470

[56] References Cited

UNITED STATES PATENTS

| 3,019,112 | 1/1962 | Rooker | 426/589 |
|---|---|---|---|
| 3,399,999 | 9/1968 | Ellett | 426/486 |
| 3,846,570 | 11/1974 | Vetter | 426/399 |
| 3,873,753 | 3/1975 | Nelson | 426/521 |

*Primary Examiner*—Jeanette M. Hunter
*Attorney, Agent, or Firm*—Wood, Herron & Evans

[57] ABSTRACT

A process and system for producing and aseptically storing apple sauce. The apples are washed, peeled and cored, soaked in a weak salt solution, comminuted, heated to 190° F.–220° F., deaerated, sterilized by heating to about 215° F. for 25 seconds or an equivalent temperature-time period, cooled to below about 100° F., and then stored in a bulk storage tank under aseptic conditions at ambient temperature. The storage can be for protracted periods without deterioration of the apple sauce. After storage, the apple sauce has a superior flavor.

12 Claims, 1 Drawing Figure

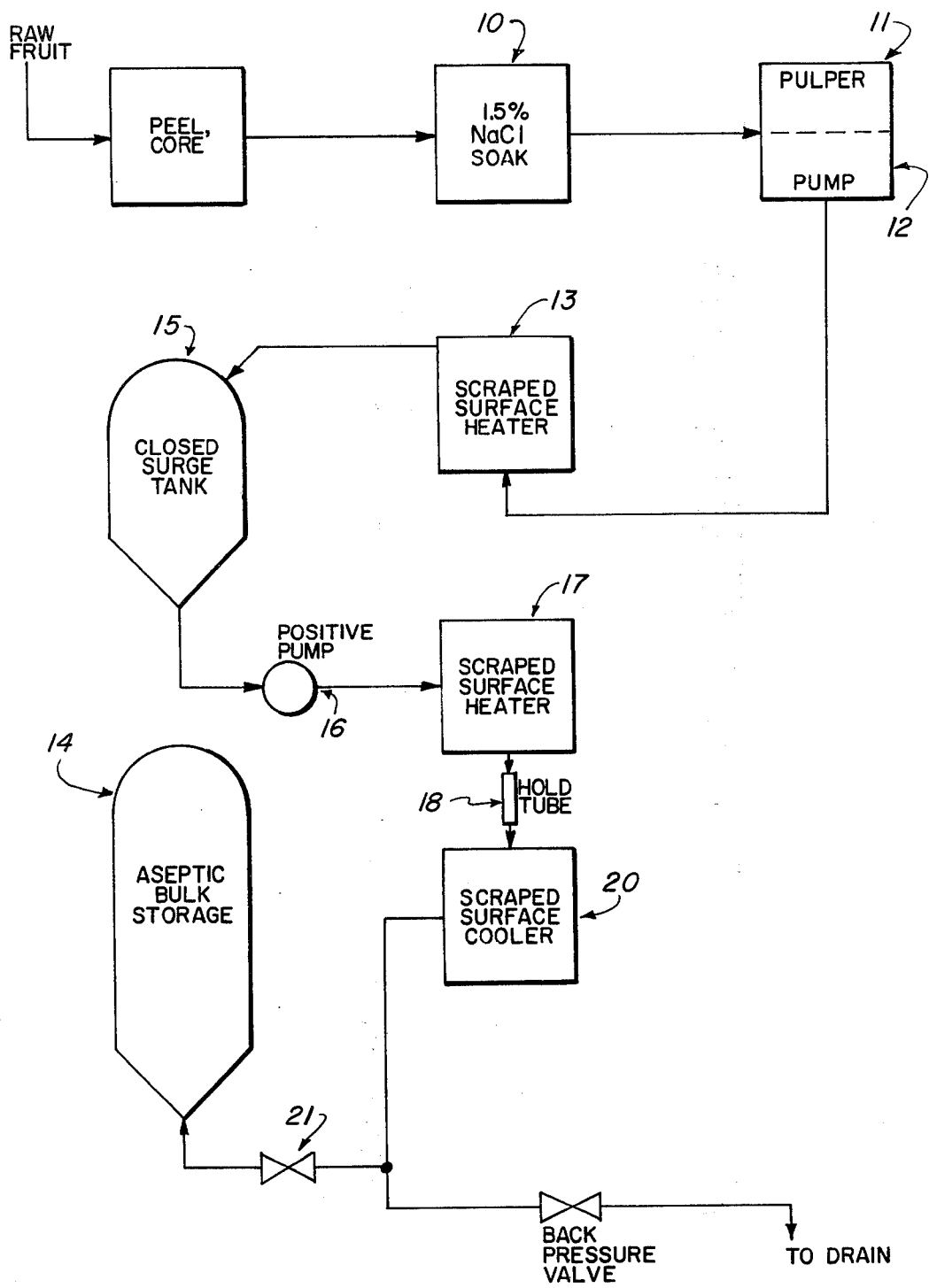

METHOD AND APPARATUS FOR ASEPTIC BULK STORAGE OF APPLE SAUCE

BACKGROUND OF THE INVENTION

This application relates to food processing and more particularly is directed to a process and system for preparing apple sauce and aseptically storing it in bulk.

In the preparation of many types of high-quality apple sauce, it is conventional to mix several different varieties of apples. Each variety contributes to one or more of the desired characteristics of a superior apple sauce, e.g., color, consistency, flavor and aroma. One difficulty which has heretofore been encountered in the production of apple sauce is that these various varieties of apples do not all ripen at the same time. Accordingly, it has been customary to store the early-ripening varieties until all of the desired varieties are ripe for processing. Heretofore, apples have conventionally been stored in wooden boxes which have been maintained in a refrigerated enviornment. Such storage has resulted in appreciable loss.

In the first place, many apples are bruised during mechanical handling and deteriorate during storage even under refrigerated conditions. Moreover, some apples are lost due to a mold growth during the storage period. Finally, there is a loss in yield due to shrinkage, i.e., dehydration, of the apples during storage.

In addition to these disadvantages, the storage of apples in this manner is also objectionable because of the substantial cost of refrigeration and because of the increasing cost and scarcity of wooden boxes.

In conventional, commercial production of apple sauce, the apples are washed, peeled, cored and trimmed and are then blanched with hot water or steam, usually in a large cooker. Thereafter, the apple sauce is pulped through a screen and is packed in cans or other small containers which are filled at a temperature of at least 180° F., are then held in boiling water and are thereafter cooled prior to shipment.

One of the difficulties with this conventional method of producing apple sauce is that the texture is degraded during blanching and an appreciable amount of the flavor and aromatic constituents of the apples are lost in the blanching operation. Moreover, I have determined that apple sauce prepared in this conventional manner must be packed at once and cannot be stored in bulk aseptically without severe deterioration of quality.

SUMMARY OF THE INVENTION

The principal object of the present invention is to provide a method and system for preparing apple sauce and storing it aseptically in bulk for protracted periods at ambient temperature.

Another object of the present invention is to provide a method of preparing and aseptically storing apple sauce which results in a product having superior aroma, taste and texture characteristics.

It is a still further object of the present invention to provide a method of processing and aseptically storing apples which is economical and which permits apples to be stored for protracted periods without loss.

More particularly, the present invention is directed to a method of processing and storing apples in which the apples are first peeled, cored and trimmed, are then soaked in a weak salt solution and comminuted or pulped into particle size which will yield the desired texture in the final apple sauce product. At this point in the process, the apples are pumped to a first heat exchanger, preferably of the scraped surface type, which rapidly heats the apples to a temperature of from approximately 180° F. to approximately 220° F. to effect a blanching operation.

In accordance with the present invention, the blanching step and, indeed, the remaining steps in processing the apples through the step of filling the large aseptic storage tank are carried out in a closed system. Moreover, at no time are the apples brought into direct contact with steam, water or other heat exchange medium. As a result, there is no deterioration of texture and no applicable loss of flavor, aromatics or other volatiles from the apples. Moreover, the utilization of a closed system prevents bacterial recontamination of the apple sauce.

After the apples have been heated momentarily in the first heat exchanger, they are deaerated in a closed surge tank or other closed deaerator unit and are then pumped to a second heat exchanger, also preferably of the scraped surface type, which sterilizes the apples by subjecting them to a predetermined time- temperature heating step. I prefer to heat the apples to approximately 215° F. for approximately 25 seconds, although other equivalent temperature-time pairs can be utilized.

After the sterilization step, the apple sauce is cooled in a third heat exchanger to a temperature below 100° F. and is then introduced into a large aseptic bulk storage tank which may hold as many as 70,000 gallons of product, or even more. The apple sauce can be stored in this tank under ambient conditions for a protracted period of several months without deterioration.

BRIEF DESCRIPTION OF THE DRAWING

The FIGURE is a schematic illustration of a system for carrying out the process of the present invention.

DESCRIPTION OF PREFERRED EMBODIMENTS

The FIGURE illustrates, in schematic form, a preferred system for carrying out the process of the present invention. As there shown, in the initial step of the process raw apples are peeled, cored and trimmed in a conventional manner. In the next step, the prepared apples are soaked in a weak sodium chloride bath 10 which, in a preferred process, is a 1.5% solution. The temperature of this solution is not critical, nor is the residence time of the apples. Again, in a preferred form of the process, this residence time is slightly less than five minutes. It is to be understood that the purpose of soaking apples in a sodium chloride solution is to wash the fruit and to prevent browning. The mechanism for accomplishing this constitutes no part of the present invention. It may take place in a bath or in a moving flume.

After soaking, the apples are fed to a pulper 11 which is effective to comminute the fruit to the proper size so as to give the desired particle or grain size to the finished product. While this size may vary from processor to processor, I prefer to comminute apples so that they will pass through a screen having openings of from approximately 1/16 inches to ½ inches.

In the next step, the apples are pumped by a pump 12 to a scraped surface heat exchanger 13. It will be appreciated that pulper 11 and pump 12 may comprise separate pieces of equipment. However, in one preferred form of the system I utilize a combined pulper-pump unit manufactured by Langsenkamp Company and designated as their "Chopper-Pump" unit.

In accordance with the present invention, the system is closed from the scraped surface heater 13 through the final aseptic bulk storage tank 14. Thus, there is only a minimal loss of the aromatic flavoring constituents from the apples during the blanching, sterilizing and deaerating operations so that the final product has a full and superior flavor. This closed system also helps to prevent bacterial contamination of the apple sauce.

The apples within scraped surface heater 13 undergo a blanching operation which is effective to inactivate enzymes present in the apples and to soften the fruit tissue. The apples are heated within the scraped surface heat exchanger to a temperature of from about 190° F. to about 220° F., and preferably to a temperature of about 200° F. to 210° F. The construction of a scraped surface heat exhanger is well known in the art and will not be described in detail. In general, however, a preferred form of scraped surface heat exchanger includes an elongated cylindrical shell which encloses a rotor carrying scrapers or blades. The shell is surrounded by an annular chamber through which a heat exchange medium, such as steam or hot water, is circulated. As the material is pumped through the heat exchanger, the blades rotate to remove any apple sauce clinging to the walls. The blades also thoroughly intermix the apple sauce so that a relatively uniform temperature is attained in the material being processed. It is important to note that the apple sauce does not directly contact the steam or other heat exhange medium.

No hold time is required for the apples which are heated in the scraped surface heat exchange unit 13. These apples are passed from the scraped surface heater to a closed deaerator, such as a surge tank 15. The apples are deaerated within this surge tank at a temperature preferably not in excess of 200° F.

A positive pump 16 then pumps the apples from the surge tank to a second scraped surface heat unit 17 (like unit 13) in which the apples are commercially sterilized by heating them to a temperature of from 180° F. to 220° F. The apples are held at this temperature for a predetermined time by passing them through a hold tube 18. It is known in the art that there are various combinations of temperatures and hold times which provide effective sterilization. I prefer the combination of heating the apples to a temperature of 214° F.–216° F. and holding them at this temperature for approximately 25 seconds. As is well known, equivalent sterilization can be obtained by using a higher temperature coupled with a shorter hold time or by using a lower temperature coupled with a longer hold time.

The now sterilized apples are introduced from hold tube 18 to a scraped surface cooler 20. The temperature of the apples is lowered in this unit to below approximately 100° F. and preferably to a temperature of about 90° F. Again, the construction of a scraped surface cooler is well known in the art. In general, however, the cooler includes a shell, rotor and blades and external chamber as described above. However, instead of steam, the heat exchange medium which is passed through the external chamber is cold water or a refrigerant, such as ammonia, Freon or the like.

The cooled, sterilized apple sauce is now pumped into an aseptic bulk storage tank 14 adapted to hold a sizable quantity, for example, 40,000 gallons of apple sauce. The construction of one suitable form of tank and the procedure for maintaining it in the proper sterilized condition is disclosed in Nelson U.S. Pat. No. 3,678,955 for "Aseptic Storage And Valving System".

It is extremely important that the storage tank 14, connecting lines, valves, such as valve 21, and the like, be thoroughly sterilized before the apple sauce is pumped into the system. One suitable procedure for accomplishing this is described in Nelson et al U.S. Pat. No. 3,873,753.

In accordance with the present invention, apple sauce may be stored in tank 14 under ambient conditions for protracted periods of time, e.g., several months to a year, without any deterioration of the stored product.

It is contemplated that different varieties of apples can be stored in separate tanks. When all of the varieties necessary to produce a desired blend are available, the apples can be removed from the storage tanks, blended in a mixing tank with sugar, citric acid or other desired additives, and canned or bottled in a conventional manner.

From the above disclosure of the general principles of the present invention and the above description of a preferred embodiment, those skilled in the art will readily comprehend that the process is susceptible to various modifications. Thus, for example, it is contemplated that certain additives, such as sugar and citric acid, can be added to the apple sauce subsequent to the blanching operation, but prior to the introduction of the apple sauce into the second, or sterilizing, heat exchanger.

In a further modification of the process, when the apple sauce is to be prepared for use as baby food, the apples are not peeled and cored. They are, however, washed, pulped and blanched as described above. However, in this modified process, they are subjected to a conventional finishing step prior to introduction into the second, or sterilizing, heat exchanger. The finishing step can be accomplished in conventional apparatus which is effective to remove the seeds and skin from the product. Many suitable types of such equipment are known to those skilled in the art and it is not considered necessary to describe this unit in detail. Again, it is to be understood that this extraction of the apple sauce in the finishing equipment takes place in a closed system so that the apples are maintained in a closed system from the time they enter the first heat exchanger 13 until they are eventually sterilized in the second heat exchanger, cooled and introduced into an aseptic bulk storage tank 14.

Further, while I have determined that scraped surface heat exchangers constitute a preferred form of equipment for carrying out the present invention, it is contemplated that one or more of the heat exchangers, such as the cooler unit 20, can be in the form of a tubular heat exchanger, such as a double tube heat exchanger manufactured by DeLaval Separator Company.

Also, while it is desirable to employ the step of immersing the apples in a salt bath to avoid browning, it is contemplated that this step could be eliminated if means are utilized for comminuting apples immediately upon peeling and coring so that no browning occurs.

Having described my invention, I claim:

1. A method of aseptically storing apple sauce comprising:
   a. peeling and coring raw apples;
   b. comminuting said apples;

c. heating said apples in a closed heater free from contact with steam to a temperature of from approximately 190° F. to approximately 220° F. to blanch said apples;
d. deaerating said apples in a closed unit;
e. heating said apples in a second closed heater to a temperature of at least 180° F. and maintaining said apples at said temperature for a time sufficient to effect sterilization thereof;
f. cooling said apples in a third heat exchanger to a temperature below about 100° F.; and
g. aseptically storing said apple sauce in bulk.

2. The method of claim 1 in which the closed heater in which said apples are first heated is a scraped surface heat exchanger.

3. The method of claim 1 in which said apples are maintained in a closed system from the time they are initially heated through the time they are aseptically stored.

4. The method of claim 1 in which the apples are initially heated to a temperature of from between about 190° F. to about 210° F. and in which said apples are subsequently heated to approximately 215° F. maintained at that temperature for approximately 25 seconds to effect sterilization.

5. The method of claim 1 in which the apples are soaked in a weak salt solution after they have been peeled and cored and before they are comminuted.

6. A method of aseptically storing apple sauce comprising the steps of:
a. comminuting said apples;
b. heating said apples in a closed heater free from contact with steam to a temperature of from approximately 190° F. to approximately 220° F. to blanch said apples;
c. subjecting said apples to a finishing operation in which the seeds and peels of said apples are removed;
d. deaerating said apples in a closed unit;
e. heating said apples in a second closed heater to a temperature of at least 180° F. and maintaining said apples at said temperature for a time sufficient to effect sterilization thereof;
f. cooling said apples in a third heat exchanger to a temperature below about 100° F.; and
g. aseptically storing said apple sauce in bulk.

7. A system for aseptically storing apple sauce from apples which have been peeled and cored comprising:
a. means comminuting said apples;
b. first closed heat exchanger means for heating said apples to a temperature of from approximately 190° F. to approximately 220° F. to blanch said apples free from contact with steam;
c. first means for transporting said apples from said comminuting means to said first closed heat exchanger means;
d. closed means for deaerating said apples;
e. second means for transporting said apples from said first heat exchanger means to said closed deaerating means;
f. second closed heat exchanger means for heating said apples to a temperature of at least 180° F. and maintaining said apples at said temperature for a time sufficient to effect sterilization thereof;
g. third means for transporting said apples from said deaerating means to said second heat exchanger;
h. third closed heat exchanger means for cooling said apples to a temperature below about 100° F.;
i. fourth transporting means for transferring apples from said second heat exchanger to said third heat exchanger;
j. tank means for aseptically storing said apple sauce in bulk;
k. fifth transporting means for transferring apples from said third heat exchanger to said last named means;
l. said system being closed from and including said first heat exchanger to and including said tank means.

8. A system for aseptically storing apple sauce comprising:
a. means comminuting said apples;
b. first closed heat exchanger means for heating said apples to a temperature of from approximately 190° F. to approximately 220° F. to blanch said apples free from contact with steam;
c. first means for transporting said apples from said comminuting means to said first closed heat exchanger means;
d. finishing means for removing seeds and peels from said apples;
e. second means for transporting said apples from said first heat exchanger means to said closed finishing means;
f. closed means for deaerating said apples;
g. third means for transporting apples from said finishing means to said deaerating means;
h. second closed heat exchanger means for heating said apples to a temperature of at least 180° F. and maintaining said apples at said temperature for a time sufficient to effect sterilization thereof;
i. fourth means for transporting said apples from said deaerating means to said second heat exchanger;
j. third closed heat exchanger means for cooling said apples to a temperature below about 100° F.;
k. fifth transporting means for transferring apples from said second heat exchanger to said third heat exchanger;
l. tank means for aseptically storing said apple sauce in bulk; and
m. sixth transporting means for transferring apples from said third heat exchanger to said last named means;
n. said system being closed from and including said first heat exchanger to and including said tank means.

9. The method of claim 1 in which both closed heaters are scraped surface heat exchangers and in which the third heat exchanger is a scraped surface heat exchanger.

10. The system of claim 7 in which said first heat exchanger means is a scraped surface heat exchanger.

11. The system of claim 7 in which said first, second and third heat exchanger means are scraped surface heat exchangers.

12. The system of claim 8 in which said first, second and third heat exchanger means are scraped surface heat exchangers.

* * * * *